(12) United States Patent
McDaniel (10) Patent No.: US 7,557,804 B1
(45) Date of Patent: Jul. 7, 2009

(54) METHODS AND APPARATUS FOR THREE-DIMENSIONAL ISOGRAPHIC NAVIGATION

(75) Inventor: William D. McDaniel, San Jose, CA (US)

(73) Assignee: Adobe Systems Inc., San Jose, CA (US)

(*) Notice: Subject to any disclaimer, the term of this patent is extended or adjusted under 35 U.S.C. 154(b) by 505 days.

(21) Appl. No.: 11/369,584

(22) Filed: Mar. 6, 2006

(51) Int. Cl.
*G06T 15/10* (2006.01)

(52) U.S. Cl. .................. 345/427; 345/419; 382/154; 715/853

(58) Field of Classification Search ............ 345/419, 345/427; 382/154; 715/853
See application file for complete search history.

(56) References Cited

U.S. PATENT DOCUMENTS

| 7,089,110 | B2 * | 8/2006 | Pechatnikov et al. | 701/210 |
| 7,355,597 | B2 * | 4/2008 | Laidlaw et al. | 345/419 |

* cited by examiner

*Primary Examiner*—Kimbinh T Nguyen
(74) *Attorney, Agent, or Firm*—Chapin IP Law, LLC (57) ABSTRACT

A system renders an object as a plurality of layers displayed within a three-dimensional view. The system receives a selection of a layer from the plurality of layers in the three-dimensional view, and renders the object as a planar view with the selected layer active, the planar view displaying the object in a two dimensional space.

27 Claims, 9 Drawing Sheets

204 RENDER AN OBJECT AS A PLURALITY OF LAYERS DISPLAYED WITHIN A THREE DIMENSIONAL VIEW

205 IDENTIFY, WITHIN THE PLANAR VIEW, A PLURALITY OF SUB OBJECTS CONTAINED WITHIN THE OBJECT

206 RENDER EACH SUB OBJECT WITHIN THE PLURALITY OF SUB OBJECTS IN THE PLANAR VIEW AS A RESPECTIVE LAYER WITHIN THE PLURALITY OF LAYERS RENDERED IN THE THREE DIMENSIONAL VIEW

207 RENDER EACH LAYER AS A VISUALLY DISTINCT LAYER WITHIN THE PLURALITY OF LAYERS

208 RENDER A DISTANCE BETWEEN EACH LAYER WITHIN THE PLURALITY OF LAYERS

209 SCALE THE PLURALITY OF LAYERS BASED ON A SIZE OF THE OBJECT

210 ORDER THE PLURALITY OF LAYERS TO CORRELATE TO AN ORDER OF THE PLURALITY OF SUB OBJECTS

FIG.4

211 RENDER EACH LAYER AS A VISUALLY DISTINCT LAYER WITHIN THE PLURALITY OF LAYERS

212 RENDER EACH LAYER TO INCLUDE AT LEAST ONE OF:
i) A VIRTUAL LIGHTING EFFECT CAUSING THE LAYER TO CAST A SHADOW
ii) AN OCCLUSION EFFECT ON THE LAYER WITHIN THE PLURALITY OF LAYERS
iii) A TRANSPARENCY EFFECT ON THE LAYER WITHIN THE PLURALITY OF LAYERS
iv) A TINT ON THE LAYER, EACH LAYER WITHIN THE PLURALITY OF LAYERS RENDERED WITH A DISTINCT TINT, THE DISTINCT TINT DIFFERENTIATED FROM THE RESPECTIVE DISTINCT TINT OF THE OTHER LAYERS BY CALCULATING A TINT DIFFERENTIAL BASED ON A NUMBER OF LAYERS WITHIN THE PLURALITY OF LAYERS
v) A MAPPING OF AN IMAGE OF THE RESPECTIVE SUB OBJECT TO THE LAYER
vi) ADDITIONAL DATA ENCODED ON THE LAYER, THE ADDITIONAL DATA DEPICTED AS GENERALLY PERPENDICULAR TO THE LAYER

213 RENDER EACH LAYER TO INCLUDE ADDITIONAL DATA INCLUDING AT LEAST ONE OF
i) A COLOR DENSITY OF THE SUB OBJECT ENCODED ON THE LAYER
ii) A TEMPERATURE DEPICTED ON THE SUB OBJECT ENCODED ON THE LAYER
iii) A SATURATION LEVEL DEPICTED THE SUB OBJECT ENCODED ON THE LAYER
iv) AN AUDIO COMPONENT ENCODED ON THE LAYER
v) A COLOR VALUE ENCODED ON THE LAYER

↓

214 RENDER A DISTANCE BETWEEN EACH LAYER WITHIN THE PLURALITY OF LAYERS

215 RENDER THE DISTANCE BETWEEN EACH LAYER TO INCLUDE SEMANTICS ASSOCIATED WITH A DEGREE OF TRANSPARENCY RELATED TO EACH LAYER

FIG. 5

216 ORDER THE PLURALITY OF LAYERS TO CORRELATE TO AN ORDER OF THE PLURALITY OF SUB OBJECTS

217 CALCULATE A LOCATION OF EACH SUB OBJECT WITHIN THE PLURALITY OF SUB OBJECTS, THE LOCATION INDICATING A REFERENCE OF EACH SUB OBJECT WITH RESPECT TO THE PLURALITY OF SUB OBJECTS

218 CALCULATE AN ANGULAR TRANSFORMATION FOR EACH SUB OBJECT WITHIN THE PLURALITY OF SUB OBJECTS, THE ANGULAR TRANSFORMATION INDICATING A GRAPHICAL ROTATION BY WHICH THE SUB OBJECT WILL BE VIEWABLE AS AN INDIVIDUAL LAYER AMONG THE PLURALITY OF LAYERS IN THE THREE DIMENSIONAL VIEW

219 OFFSET EACH LAYER WITHIN THE PLURALITY OF LAYERS SUCH THAT EACH LAYER IS SELECTABLE WITHIN THE THREE DIMENSIONAL VIEW

228 RENDER THE OBJECT AS A PLANAR VIEW WITH THE SELECTED LAYER ACTIVE, THE PLANAR VIEW DISPLAYING THE OBJECT IN A TWO DIMENSIONAL SPACE

229 DETECT AN INPUT DEVICE POSITIONED ON A LOCATION ON THE PLURALITY OF LAYERS, THE LOCATION SITUATED WITHIN A PLURALITY OF BOUNDARIES DEFINING THE PLURALITY OF LAYERS

230 IDENTIFY A TOP MOST LAYER AS THE SELECTED LAYER, THE TOP MOST LAYER CONTAINED BY THE PLURALITY OF BOUNDARIES ASSOCIATED WITH THAT TOP MOST LAYER

231 ACCENTUATE, ON THE PLANAR VIEW, THE SUB OBJECT THAT CORRESPONDS TO THE SELECTED LAYER

*FIG. 8*

232 PROVIDE A GRAPHICAL USER INTERFACE CAPABLE TO PERFORM:
I) ACTIONS ON THE OBJECT IN THE PLANAR VIEW, AND
II) ACTIONS ON THE PLURALITY OF LAYERS IN THE THREE DIMENSIONAL VIEW

233 PERFORM A ROTATION THE PLURALITY OF THE PLURALITY OF LAYERS IN THE THREE DIMENSIONAL VIEW

↓

234 DISPLAY AN EFFECT OF THE ROTATION OF THE PLURALITY OF LAYERS IN THE THREE DIMENSIONAL VIEW

↓

235 DISPLAY AN EFFECT OF THE ROTATION OF THE PLURALITY OF LAYERS ON THE OBJECT IN THE PLANAR VIEW

OR

236 PROVIDE TOGGLING BETWEEN THE THREE DIMENSIONAL VIEW AND THE PLANAR VIEW, AND
DISPLAYING:
I) A RESULT OF THE ACTIONS PERFORMED ON THE THREE DIMENSIONAL VIEW RENDERED ON THE PLANAR VIEW
II) A RESULT OF THE ACTIONS PERFORMED ON THE PLANAR VIEW RENDERED ON THE THREE DIMENSIONAL VIEW

*FIG. 9*

METHODS AND APPARATUS FOR THREE-DIMENSIONAL ISOGRAPHIC NAVIGATION

BACKGROUND

Conventional computerized devices, such as personal computers, laptop computers, and the like utilize graphical user interface in applications such as operating systems and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons and the user can operate an input device such as a mouse to move a mouse pointer onto an icon (i.e., graphically overlapping the icon) on the graphical user interface. By depressing a mouse button, the application such as the operating system desktop selects the icon and if the user maintains the mouse button in a depressed state, the user can drag the icon across the graphical user interface. By releasing the mouse button, the icon is placed on the graphical user interface at the current position of the mouse pointer.

Using graphical user interface technology, users can create and update documents or graphics comprised of multiple logical layers. A layer can be a collection of document elements such as text and images grouped together for collective editing and manipulation. The collection is separated from other collections and metaphorically constitutes a transparent overlay covering the document substrate (i.e., a virtual model of the physical medium a document will be rendered onto by a document editor). The stack of these overlays has a logical order with higher overlays covering and possibly occluding lower overlays where elements overlap.

Documents and graphic images are often created as a vertical (or horizontal) stack of logical layers. Each layer contains certain elements such as text or images. The layers have an implied order such that elements in the topmost layer cover elements in the next lower layer and so on down to the lowest layer.

SUMMARY

Conventional technologies for manipulating graphical objects (i.e., text, text boxes, images, icons, etc.) in a two dimensional view editor within a graphical user interface suffer from a variety of deficiencies. In particular, conventional technologies for manipulating graphical objects in a two dimensional view editor within a graphical user interface are limited in that it is difficult to easily visualize the layers contained within a graphical object when viewed in a two dimensional view. It is also difficult to select an individual layer within the graphical object for viewing and/or manipulation. For example, if a user wishes to select a particular layer to edit, there may exist a list of written descriptions for each layer. The user must determine which written description of each layer matches the actual layer the user wishes to edit, and then select that layer based on an assumption that the written description maps to the selected layer. This can lead to errors and frustration on the part of the user. Additionally, within a two dimensional view editor, the order of the layers from top to bottom is not obvious, leading to additional frustration when a user attempts to reorder the layers.

Embodiments disclosed herein significantly overcome such deficiencies and provide a system that includes a computer system executing an object navigating process within a graphical user interface. The object navigating process operates within a graphical user interface providing a three-dimensional view and a planar (i.e., two dimensional) view. The three-dimensional view and the planar view can be viewed side by side or separately. The object navigating process renders the object (i.e., a graphical object) as a plurality of layers within the three-dimensional view. Each layer within the plurality of layers is distinguished from the other layers by a distinct translucent tint, and is easily selectable. The differential in tint between the layers is determined by an RGB value based on the number of layers contained within the object. A user can easily select a layer, perform an action on that layer, and the resulting effect is displayed on the object within the planar view. A user can also easily reorder the layers within the three-dimensional view by selecting a layer and moving the selected layer to the new location (i.e., the new location with respect to the remaining layers). The remaining layers will be displaced accordingly, and, again, the resulting effect on the object is displayed in the planar view.

Embodiments disclosed herein provide a computer system executing an object navigating process within a graphical user interface. The object navigating process renders an object as a plurality of layers displayed within a three-dimensional view. The object navigating process then receives a selection of a layer from the plurality of layers in the three-dimensional view, and renders the object as a planar view with the selected layer active. The planar view displays the object in a two dimensional space.

During an example operation of one embodiment, suppose a user, such as a graphical designer, wishes to reorder layers contained within an object. The object navigating process renders the object on the three-dimensional view as the five layers that comprise the object, while also displaying a two dimensional view of the object within the planar view. The five layers are displayed within the three-dimensional view, each layer with a distinct tint distinguishing each of the five layers individually (i.e., creating a rainbow effect of colors). The user selects one of the five layers by placing a mouse on the boundary of the layer, and moving the selected layer orthogonally with respect to the two dimensional representation of the layers (i.e., through the 'z' plane) to the new location of the selected layer in the order of layers in the three-dimensional view (representing the object displayed within the planar view). The object navigating process reorders the remaining four layers based on the displacement of the selected layer in the new position, and displays the resulting effect on the object within the planar view with the selected layer highlighted.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The embodiments disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein provide a computer system executing an object navigating process within a graphical user interface. The object navigating process operates within a graphical user interface providing a three-dimensional view and a planar (i.e., two dimensional) view of the object. The three-dimensional view and the planar view can be viewed side by side or separately. The object navigating process renders the object (i.e., a graphical object) as a plurality of layers within the three-dimensional view. Each layer within the plurality of layers is distinguished from the other layers by a distinct translucent tint, and is easily selectable. The differential in tint between the layers is determined by an RGB value based on the number of layers contained within the object. A user can easily select a layer, perform an action on that layer, and the resulting effect is displayed on the object within the planar view. A user can also easily reorder the layers within the three-dimensional view by selecting a layer and moving the selected layer to the new location (i.e., the new location with respect to the remaining layers). The remaining layers will be displaced accordingly, and, again, the resulting effect on the object is displayed in the planar view.

Embodiments disclosed herein provide a computer system executing an object navigating process within a graphical user interface. The object navigating process renders an object as a plurality of layers displayed within a three-dimensional view. The object navigating process receives a selection of a layer from the plurality of layers in the three-dimensional view, and renders the object as a planar view with the selected layer active. The planar view displays the object in a two dimensional space.

Figure 1:
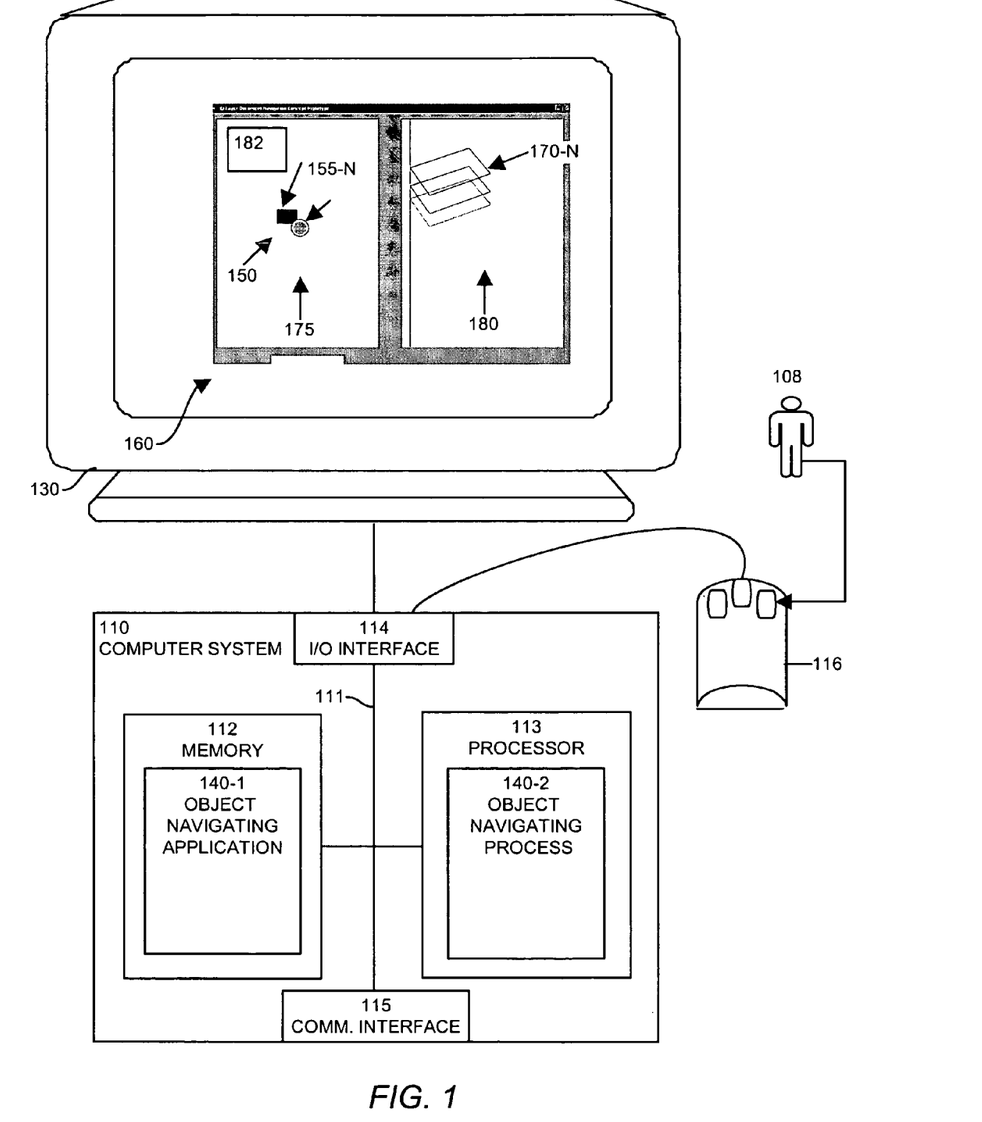
FIG. 1 shows a high-level block diagram of a computer system according to one embodiment disclosed herein.

FIG. 1 is a block diagram illustrating example architecture of a computer system 110 that executes, runs, interprets, operates or otherwise performs an object navigating application 140-1 and object navigating process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the object navigating application 140-1 and process 140-2 provides on the display 130. The graphical user interface 160 displays a planar view 180 containing an object 150 (comprised of sub objects 155-N), a written description 182 of the layers, and a three-dimensional view 175 containing a plurality of layers 170-N. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an object navigating application 140-1 that includes a graphical user interface 160 displaying a planar view 180 containing an object 150 (comprised of sub objects 155-N), and a three-dimensional view 175 containing a plurality of layers 170-N as explained herein. The object navigating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the object navigating application 140-1. Execution of the object navigating application 140-1 in this manner produces processing functionality in an object navigating process 140-2. In other words, the object navigating process 140-2 represents one or more portions or runtime instances of the object navigating application 140-1 (or the entire object navigating application 140-1) performing or executing within or upon the processor 113 in the computerized device 110 at runtime.

It is noted that example configurations disclosed herein include the object navigating application 140-1 itself (i.e., in the form of un-executed or non-performing logic instructions and/or data). The object navigating application 140-1 may be stored on a computer readable medium (such as a floppy disk), hard disk, electronic, magnetic, optical, or other computer readable medium. The object navigating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the object navigating application 140-1 in the processor 113 as the object navigating process 140-2. Those skilled in the art will understand that the computer system 110 may include other processes and/or software and hardware components, such as an operating system not shown in this example.

A display 130 need not be coupled directly to computer system 110. For example, the object navigating application 140-1 can be executed on a remotely accessible computerized device via the network interface 115. In this instance, the graphical user interface 160 may be displayed locally to a user 108 of the remote computer and execution of the processing herein may be client-server or web-server based.

Figure 2:
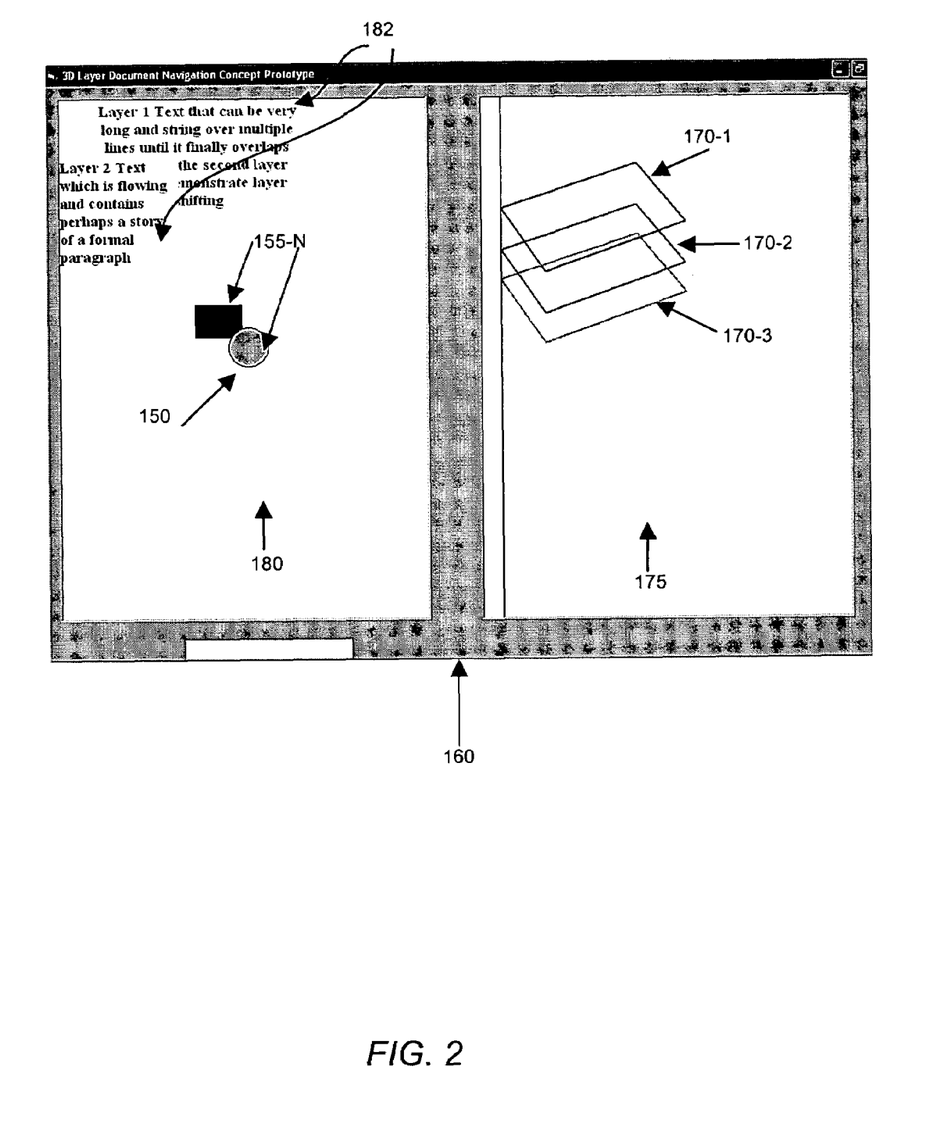
FIG. 2 shows a screenshot of the graphical user interface operating the object navigating process including the three-dimensional view and the planar view, according to one embodiment disclosed herein.

FIG. 2 is a screenshot of an example graphical user interface 160 displaying a planar view 180 containing an object 150 (comprised of sub objects 155-N), and a three-dimensional view 175 containing a plurality of layers 170-N. It should be noted that an object 150 could be comprised of one or more sub objects 155-N. Therefore, an example where there are two objects 150-N within the planar view 180 may display any number of layers 170-N within the three-dimensional view 175. That is, two objects 150-N in the planar view 180 may result in three layers 170-N displayed in the three-dimensional view 175.

Further details of configurations explained herein will now be provided with respect to a flow chart of processing steps that show the high level operations disclosed herein to perform the object navigating process 140-2.

Figure 3:
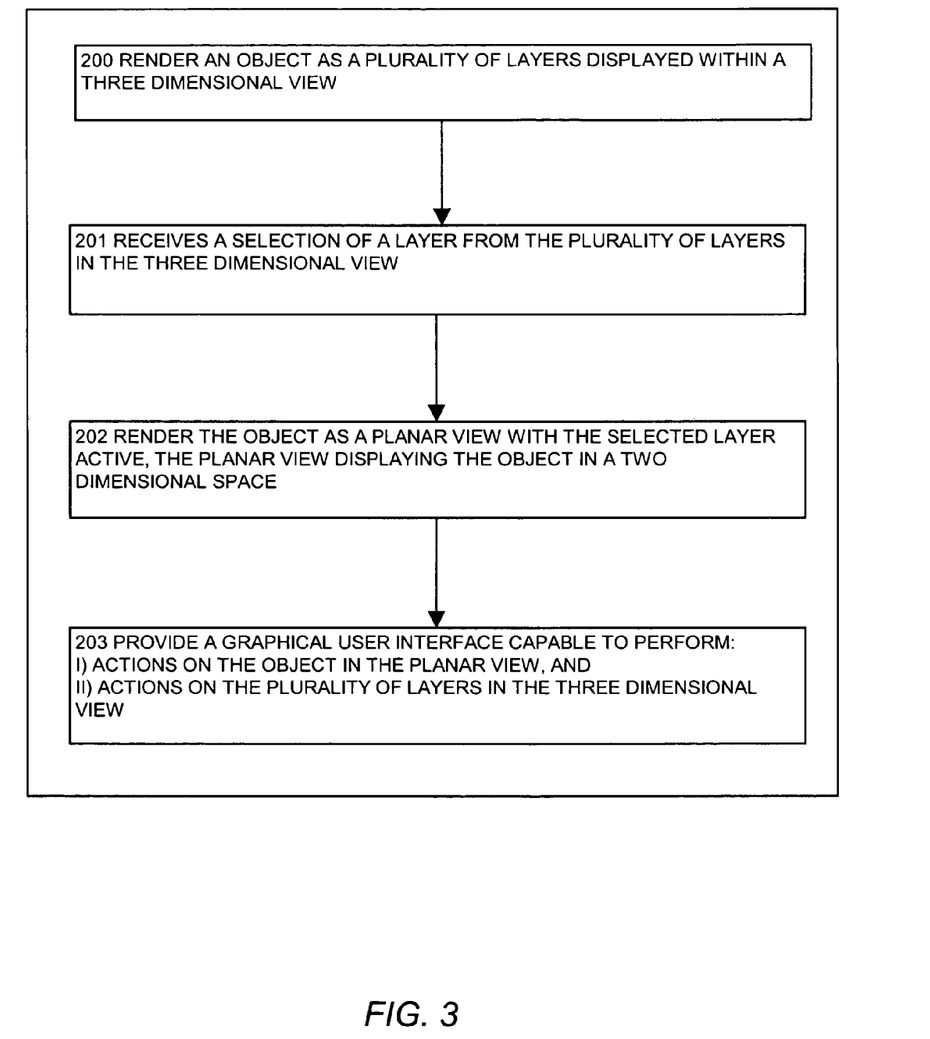
FIG. 3 illustrates a flowchart of a procedure performed by the system of FIG. 1 when the object navigating process renders an object as a plurality of layers displayed within a three-dimensional view, according to one embodiment disclosed herein.

FIG. 3 is an embodiment of the steps performed by the object navigating process 140-2 when it renders an object 150 as a plurality of layers 170-N displayed within a three-dimensional view 175, and operates the graphical user interface 160 to perform actions on the object 150 in the planar view 180, and actions on the plurality of layers 170-N in the three-dimensional view 175.

In step 200, the object navigating process 140-2 renders an object 150 as a plurality of layers 170-N displayed within a three-dimensional view 175. In an example configuration, a user 108 creates the object 150 within the planar view 180. The object 150 (displayed as an object 150 within the planar view 180) is rendered within the three-dimensional view 175 as a plurality of layers 170-N representing components (i.e., the sub objects 155-N) of the object 150. Thus, the object navigating process 140-2 presents a more intuitive visualization of the object 150.

In step 201, the object navigating process 140-2 receives a selection of a layer 170-1 from the plurality of layers 170-N in the three-dimensional view 175. In an example configuration, the user 108, operating the graphical user interface 160, receives a selection (for example, from a user 108) of a layer 170-1 from the plurality of layers 170-N within the three-dimensional view 175. The object navigating process 140-2 receives this selection from the user 108, and selects the layer 170-1 from the plurality of layers 170-N in the three-dimensional view 175.

In step 202, the object navigating process 140-2 renders the object 150 as a planar view 180 with the selected layer 170-1 active. The planar view 180 displays the object 150 in a two dimensional space. In an example configuration, the object navigating process 140-2 receives a selection from the user 108, and selects the layer 170-1 from the plurality of layers 170-N in the three-dimensional view 175. In response, the object navigating process 140-2 renders the object 150 as a planar view 180 with the selected layer 170-1 active, indicating the selected layer 170-1 has been chosen by the user 108. In other words, when a layer 170-1 in the three-dimensional view 175 is selected, the object navigating process 140-2 renders the object 150 in the planar view 180 with the selected layer 170-1 active.

In step 203, the object navigating process 140-2 provides a graphical user interface 160 capable to perform actions on the object 150 in the planar view 180, and actions on the plurality of layers 170-N in the three-dimensional view 175. In an example configuration, a user 108 can add/delete/modify/manipulate/etc. the object 150 in the planar view 180. The user 108 can also add/delete/modify/manipulate/etc the plurality of layers 170-N in the three-dimensional view 175. In response, those additions/deletions/modifications/manipulations/etc will be reflected on both the object 150 in the planar view 180, and the plurality of layers 170-N in the three-dimensional view 175.

Figure 4:
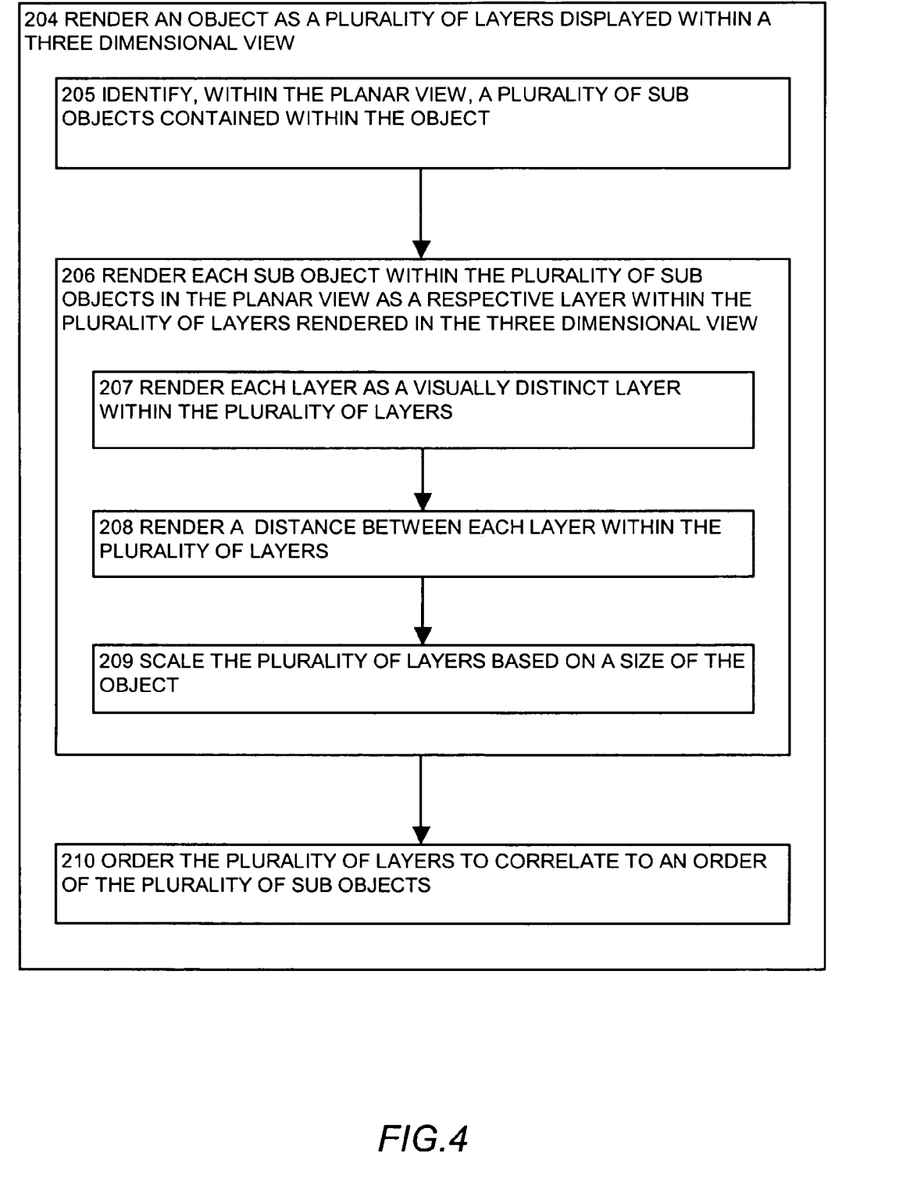
FIG. 4 illustrates a flowchart of a procedure performed by the system of FIG. 1 when the object navigating process renders an object as a plurality of layers, the plurality of layers corresponding to sub objects contained within the object, according to one embodiment disclosed herein.

FIG. 4 is an embodiment of the steps performed by the object navigating process 140-2 when it renders an object 150 as a plurality of layers 170-N displayed within a three-dimensional view 175. Each layer 170-1 in the plurality of layers 170-N corresponds to sub objects 155-N contained within the object 150.

In step 204, the object navigating process 140-2 renders an object 150 as a plurality of layers 170-N displayed within a three-dimensional view 175. In an example configuration, a user 108 creates the object 150 within the planar view 180. The object 150 (displayed as an object 150 within the planar view 180) is rendered within the three-dimensional view 175 as a plurality of layers 170-N representing components of the object 150 (i.e., the sub objects 155-N).

In step 205, the object navigating process 140-2 identifies, within the planar view 180, a plurality of sub objects 155-N contained within the object 150. In an example configuration, a user 108 creates an object 150, in the planar view 180, by layering, and arranging sub objects 155-N (i.e., text, graphics, text box, etc). The object navigating process 140-2 identifies the plurality of sub objects 155-N contained within the object 150. It should be noted that the plurality of layers 170-N could be arranged vertically, or horizontally.

In step 206, the object navigating process 140-2 renders each sub object 155-1 within the plurality of sub objects 155-N in the planar view 180 as a respective layer 170-1 within the plurality of layers 170-N rendered in the three-dimensional view 175. In other words, each sub object 155-1 within the object 150 (in the planar view 180) corresponds to a respective layer 170-1 rendered in the three-dimensional view 175.

In step 207, the object navigating process 140-2 renders each layer 170-1 as a visually distinct layer 170-1 within the plurality of layers 170-N. In an example configuration, each layer 170-1 has a different color from the other layers in the plurality of layers 170-N such that a user 108 can easily distinguish one layer 170-1 from another layer 170-2. Each layer 170-1 is also rendered such that a user 108 is able to easily select each layer 170-1 individually (i.e., for manipulation, editing, etc).

In step 208, the object navigating process 140-2 renders a vertical (or horizontal) distance between each layer 170-1 within the plurality of layers 170-N. The object navigating process 140-2 displays each layer 170-1 within the plurality of layers 170-N with a vertical (or horizontal) distance between each of the layers 170-N such that a user 108 is able to easily select each layer 170-1 individually (i.e., for manipulation, editing, etc).

In step 209, the object navigating process 140-2 scales the plurality of layers 170-N based on a size of the object 150. In an example configuration, the object navigating process 140-2 renders the size of the plurality of layers 170-N in the three-dimensional view 175 to be proportional to the size of the object 150 in the planar view 180. In another example configuration, there is more than one object 150 in the planar view 180. The object navigating process 140-2 renders a plurality of layers 170-N for each object 150, and proportionally scales each plurality of layers 170-N in accordance with the respective object 150 to which that plurality of layers 170-N corresponds.

In step 210, the object navigating process 140-2 orders the plurality of layers 170-N to correlate to an order of the plurality of sub objects 155-N. In an example configuration, the object 150 (created by the user 108 within the planar view 180) is created by layering sub objects 155-N. The object navigating process 140-2 renders those sub objects 155-N as corresponding layers (i.e., the plurality of layers 170-N) within the three-dimensional view 175, and orders the layers (i.e., the plurality of layers 170-N) to correlate to the layering of the sub objects 155-N within the object 150.

Figure 5:
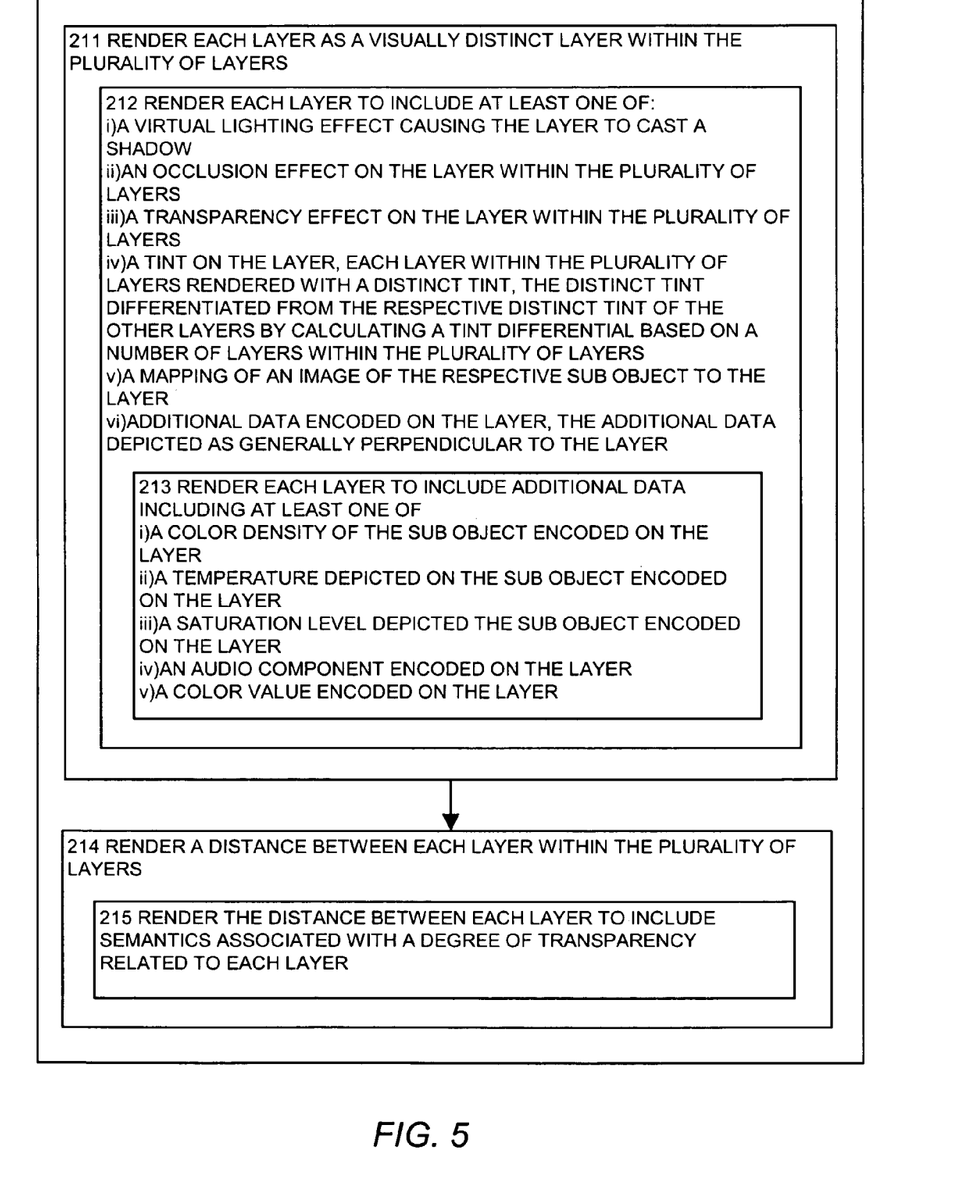
FIG. 5 illustrates a flowchart of a procedure performed by the system of FIG. 1 when the object navigating process renders each layer as a visually distinct layer within the plurality of layers, according to one embodiment disclosed herein.

FIG. 5 is an embodiment of the steps performed by the object navigating process 140-2 when it renders each layer 170-1 as a visually distinct layer 170-1 within the plurality of layers 170-N to facilitate viewing by a user 108.

In step 211, the object navigating process 140-2 renders each layer 170-1 as a visually distinct layer 170-1 within the plurality of layers 170-N. In an example configuration, each layer 170-1 has a different color from the other layers in the plurality of layers 170-N such that a user 108 can distinguish one layer 170-1 from another layer 170-2. Each layer 170-1 is also rendered such that a user 108 is able to easily select each layer 170-1 individually (i.e., for manipulation, editing, etc).

In step 212, the object navigating process 140-2 renders each layer 170-1 to include at least one of:

i) A virtual lighting effect causing the layer 170-1 to cast a shadow on any layers 170-N below the layer 170-1. In an example configuration, the object navigating process 140-2 renders the layer 170-1 to cast a shadow on the substrate (i.e., the virtual model of the physical medium a document will be rendered onto by a document editor). The order of layers 170-N is determined by the creation and/or manipulation of the sub objects 155-N (within the planar view 180) or the layers 170-N (within the three-dimensional view 175).

ii) An occlusion effect on the layer 170-1 within the plurality of layers 170-N causing the layer 170-1 to occlude (i.e., "block") another layer 170-2 or a plurality of layers 170-N.

iii) A transparency effect on the layer 170-1 within the plurality of layers 170-N such that the plurality of layers 170-N are visible below the layer 170-1.

iv) A tint on the layer 170-1 such that each layer 170-1 is distinguished by the remaining layers 170-N in the plurality of layers 170-N. In an example configuration each layer 170-1 within the plurality of layers 170-N is rendered with a distinct tint. The distinct tint is differentiated from the respective distinct tint of the other layers 170-N by calculating a tint differential based on a number of layers 170-N within the plurality of layers 170-N. In an example configuration, the tint color the bottom layer 170-N is rendered white. Each tint color for the remaining layers 170-N-1 through 170-1 above the bottom layer 170-N is rendered via a shift in the green value of the RGB color. The shift is determined by the calculation of 255/n where n is the number of layers 170-N available.

v) A mapping of an image of the respective sub object 150-1 to the layer 170-1 such that the contents of the sub object 150-1 are displayed as an image on the layer 170-1.

vi) Additional data encoded on the layer 170-1 such that the additional data is visible on the layer 170-1. In an example configuration, the additional data is depicted as generally perpendicular to the layer 170-1. For example, the additional data can be viewed as peaks and valleys displayed at a ninety degree angle on the layer 170-1. Further examples are detailed within the sub step 213.

In step 213, the object navigating process 140-2 renders each layer 170-1 to include additional data including at least one of:

i) A color density of the sub object 150-1 encoded on the layer 170-1 such that the variations in color density of the sub object 150-1 are mapped to the layer 170-1 in a three-dimensional fashion. For example, the variations in color density of the sub object 150-1 are displayed on the layer 170-1 as peaks and valleys depending on the variations in the color density.

ii) A temperature depicted on the sub object 150-1 encoded on the layer 170-1 such that the variations in temperature of the sub object 150-1 are mapped to the layer 170-1 in a three-dimensional fashion. For example, the variations in temperature of the sub object 150-1 are displayed on the layer 170-1 as peaks and valleys depending on the variations in temperature.

iii) A saturation level depicted on the sub object 150-1 encoded on the layer 170-1 such that the variations in saturation level of the sub object 150-1 are mapped to the layer 170-1 in a three-dimensional fashion. For example, the variations in the saturation level of the sub object 150-1 are displayed on the layer 170-1 as peaks and valleys depending on the variations in saturation level.

iv) An audio component depicted on the sub object 150-1 encoded on the layer 170-1 such that the variations in the audio components of the sub object 150-1 are mapped to the layer 170-1 in a three-dimensional fashion. For example, the variations in audio components of the sub object 150-1 are displayed on the layer 170-1 as peaks and valleys depending on the variations in the audio components.

v) A color value encoded on the layer depicted on the sub object 150-1 encoded on the layer 170-1 such that the variations in the color value of the sub object 150-1 are mapped to the layer 170-1 in a three-dimensional fashion. For example, the variations in the color value of the sub object 150-1 are displayed on the layer 170-1 as peaks and valleys depending on the variations in the color values.

In step 214, the object navigating process 140-2 renders a vertical (or horizontal) distance between each layer 170-1 within the plurality of layers 170-N. The object navigating process 140-2 displays each layer 170-1 within the plurality of layers 170-N with a vertical (or horizontal) distance between each of the layers 170-N such that a user 108 is able to easily select each layer 170-1 individually (i.e., for manipulation, editing, etc).

In step 215, the object navigating process 140-2 renders the vertical (or horizontal) distance between each layer 170-N to include semantics associated with a degree of transparency related to each layer 170-N. In an example configuration, the vertical (or horizontal) space between the plurality of layers 170-N rendered on the three-dimensional view 175 includes information related to the degree of transparency of each layer 170-1 within the plurality of layers 170-N. In other words, the plurality of layers 170-N may have different degrees of translucency, each degree of translucency represented visually on each layer 170-1 within the plurality of layers 170-N.

Figure 6:
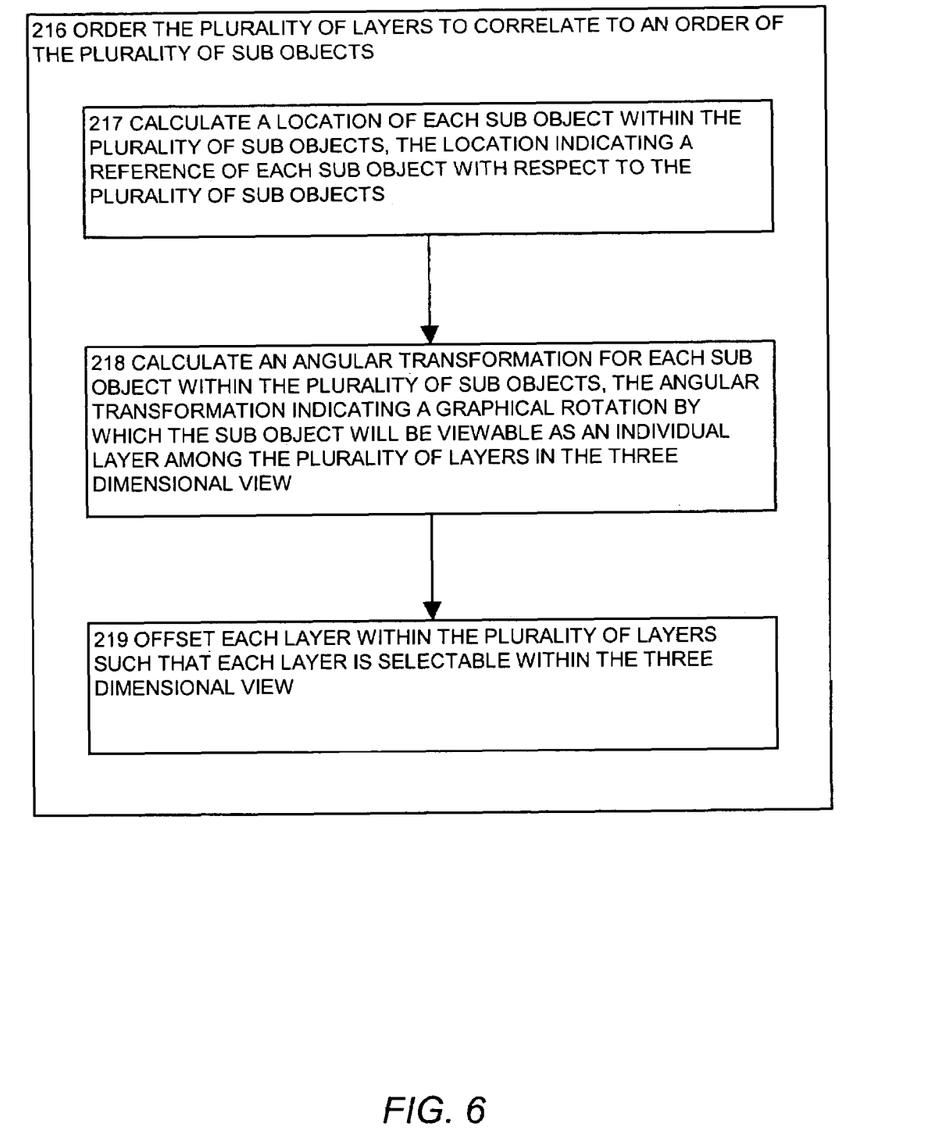
FIG. 6 illustrates a flowchart of a procedure performed by the system of FIG. 1 when the object navigating process orders the plurality of layers to correlate to an order of the plurality of sub objects, according to one embodiment disclosed herein.

FIG. 6 is an embodiment of the steps performed by the object navigating process 140-2 when it orders the plurality of layers 170-N to correlate to an order of the plurality of sub objects 155-N, and calculates the spatial relationship between the plurality of layers 170-N within the three-dimensional view 175.

In step 216, the object navigating process 140-2 orders the plurality of layers 170-N to correlate to an order of the plurality of sub objects 155-N. In an example configuration, the user 108 creates the object 150 (within the planar view 180) by layering sub objects 155-N. The object navigating process 140-2 renders those sub objects 155-N as corresponding layers (i.e., the plurality of layers 170-N) within the three-dimensional view 175, and orders the plurality of layers 170-N to correlate to the layering of the sub objects 155-N within the object 150.

In step 217, the object navigating process 140-2 calculates a location of each sub object 155-1 within the plurality of sub objects 155-N. The location indicates a reference of each sub object 155-1 with respect to the plurality of sub objects 155-N. In other words, the object navigating process 140-2 calculates the location of each sub object 155-1 with respect to the remaining sub objects 155-N within the plurality of sub objects 155-N. This location value is used to map the location of the sub objects 155-N (within the planar view 180) to the location of the layers 170-N (within the three-dimensional view 175).

In step 218, the object navigating process 140-2 calculates an angular transformation for each sub object 155-1 within the plurality of sub objects 155-N. The angular transformation indicates a graphical rotation by which the sub object 155-1 will be viewable as an individual layer 170-1 among the plurality of layers 177-N in the three-dimensional view 175. In other words, the object navigating process 140-2 calculates an angular transformation for each sub object 155-1 such that the respective layer 170-1 (that corresponds to the sub object 150-1) is angled such that the respective layer 170-1 is viewable by a user 108.

In step 219, the object navigating process 140-2 offsets each layer 170-1 within the plurality of layers 170-N such that each layer 170-1 is selectable within the three-dimensional view 175. In an example configuration, the object navigating process 140-2 offsets each layer 170-1 within the plurality of layers 170-N such that a user 108, operating in the three-dimensional view 175, can easily select each individual layer 170-1 within the plurality of layers 170-N.

Figure 7:
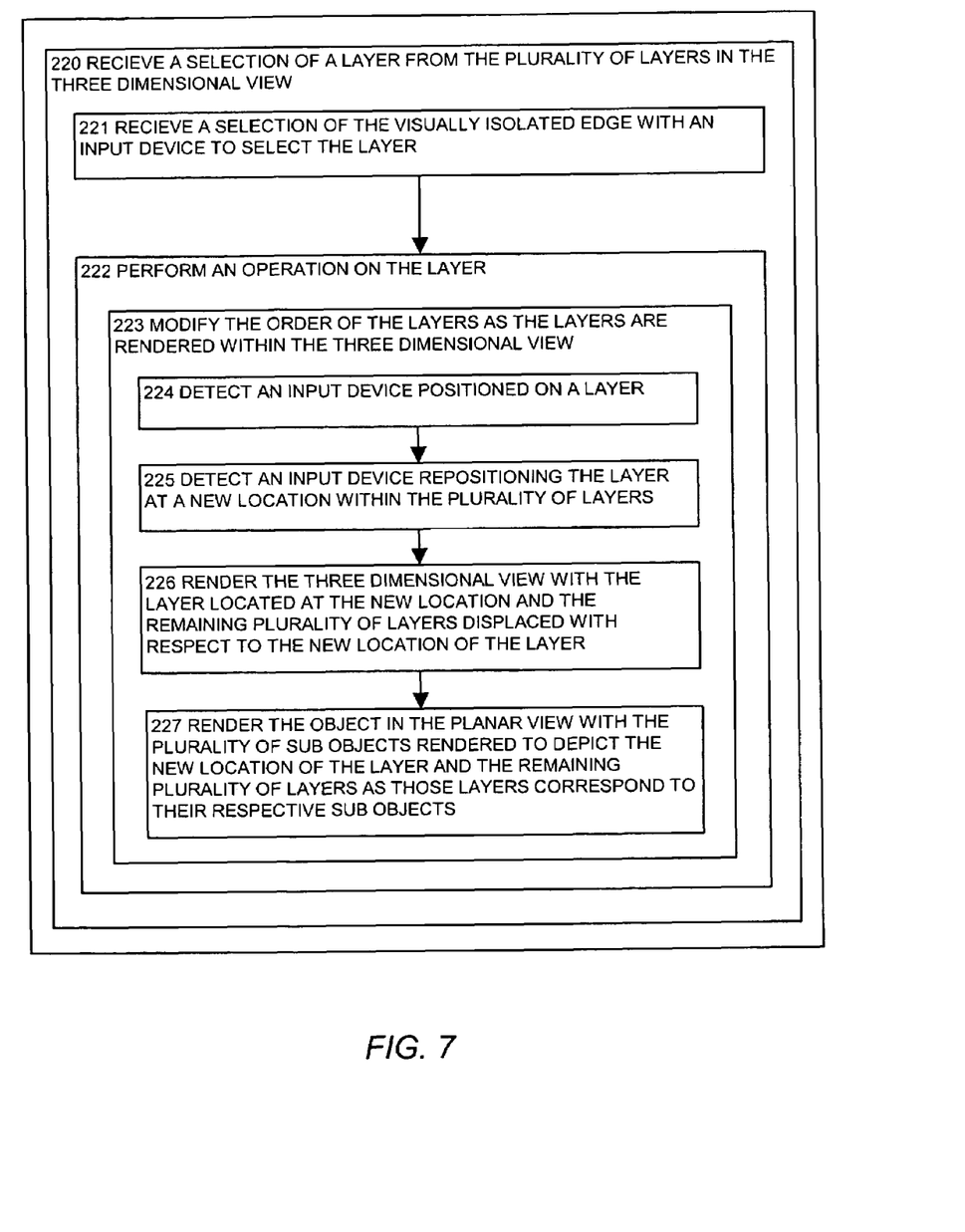
FIG. 7 illustrates a flowchart of a procedure performed by the system of FIG. 1 when the object navigating process selects a layer from the plurality of layers in the three-dimensional view, according to one embodiment disclosed herein.

FIG. 7 is an embodiment of the steps performed by the object navigating process 140-2 when it selects a layer 170-1 from the plurality of layers 170-N in the three-dimensional view 175, and performs an operation on that layer 170-1.

In step 220, the object navigating process 140-2 receives a selection of a layer 170-1 from the plurality of layers 170-N in the three-dimensional view 175. In an example configuration, the user 108, operating the graphical user interface 160, selects a layer 170-1 from the plurality of layers 170-N within the three-dimensional view 175. The object navigating process 140-2 receives this selection from the user 108, and selects the layer 170-1 from the plurality of layers 170-N in the three-dimensional view 175.

In step 221, the object navigating process 140-2 receives a selection of the visually isolated edge with an input device 116 to select the layer 170-1. In an example configuration, the object navigating process 140-2 detects an input device 116 (i.e., a mouse, pointer, etc) on the edge (i.e., boundary) of a layer 170-1. The position of the input device 116 correlates with the position of the layers 170-N. The uppermost layer 170-1 that the input device 116 is in contact with is selected.

In step 222, the object navigating process 140-2 allows a user to perform an operation on the layer 170-1. In an example configuration, the object navigating process 140-2 can modify/delete/manipulate/etc the selected layer 170-1 that was selected when the object navigating process 140-2 detected an input device 116 on the edge of a layer 170-1.

In step 223, the object navigating process 140-2 modifies the order of the layers 170-N as the layers 170-N are rendered within the three-dimensional view 175. In an example configuration, the object 150, created by the user 108 within the planar view 180, is created by layering sub objects 155-N. The object navigating process 140-2 renders those sub objects 155-N as corresponding layers within the three-dimensional view 175, and orders the layers (i.e., the plurality of layers 170-N) to correlate to the layering of the sub objects 155-N within the object 150. In an example configuration, the user 108 changes the order of those layers 170-N, and the object navigating process 140-2 modifies the order of the layers 170-N as the layers 170-N are rendered within the three-dimensional view 175.

In step 224, the object navigating process 140-2 detects an input device 116 positioned on a layer 170-N. In an example configuration, the object navigating process 140-2 detects an input device 116 (i.e., a mouse, pointer, etc) on the edge (i.e., boundary) of a layer 170-1. The position of the input device 116 correlates with the position of the layers 170-N (meaning the input device 116 is technically touching more than one layer 170-1). The uppermost layer 170-1 that the input device 116 is in contact with, is selected.

In step 225, the object navigating process 140-2 detects an input device 116 repositioning the layer 170-1 at a new location within the plurality of layers 170-N. In an example configuration, a user 108, using an input device 116, selects a layer 170-1, and repositions that layer 170-1, essentially, reordering the plurality of layers 170-N.

In step 226, the object navigating process 140-2 renders the three-dimensional view 175 with the layer 170-1 located at the new location, and the remaining plurality of layers 170-N displaced with respect to the new location of the layer 170-1. In an example configuration, a user 108, using an input device 116, selects a layer 170-1, and repositions that layer 170-1, essentially, reordering the plurality of layers 170-N. The object navigating process 140-2 reorders the plurality of layers 170-1 with respect to the new position to which the user 108 moved the layer 170-1.

In step 227, the object navigating process 140-2 renders the object 150 in the planar view 180 with the plurality of sub objects 155-N rendered to depict the new location of the layer 170-1, and the remaining plurality of layers 170-N as those layers 170-N correspond to their respective sub objects 155-N. In other words, the layer 170-1 in the three-dimensional view 175 was repositioned within the plurality of layers 170-N, causing the plurality of layers 170-N to be reordered. In response, the object navigating process 140-2 reorders the sub objects 155-N in the planar view 180 to correspond to the reordering of the layers 170-N within the three-dimensional view 175.

Figure 8:
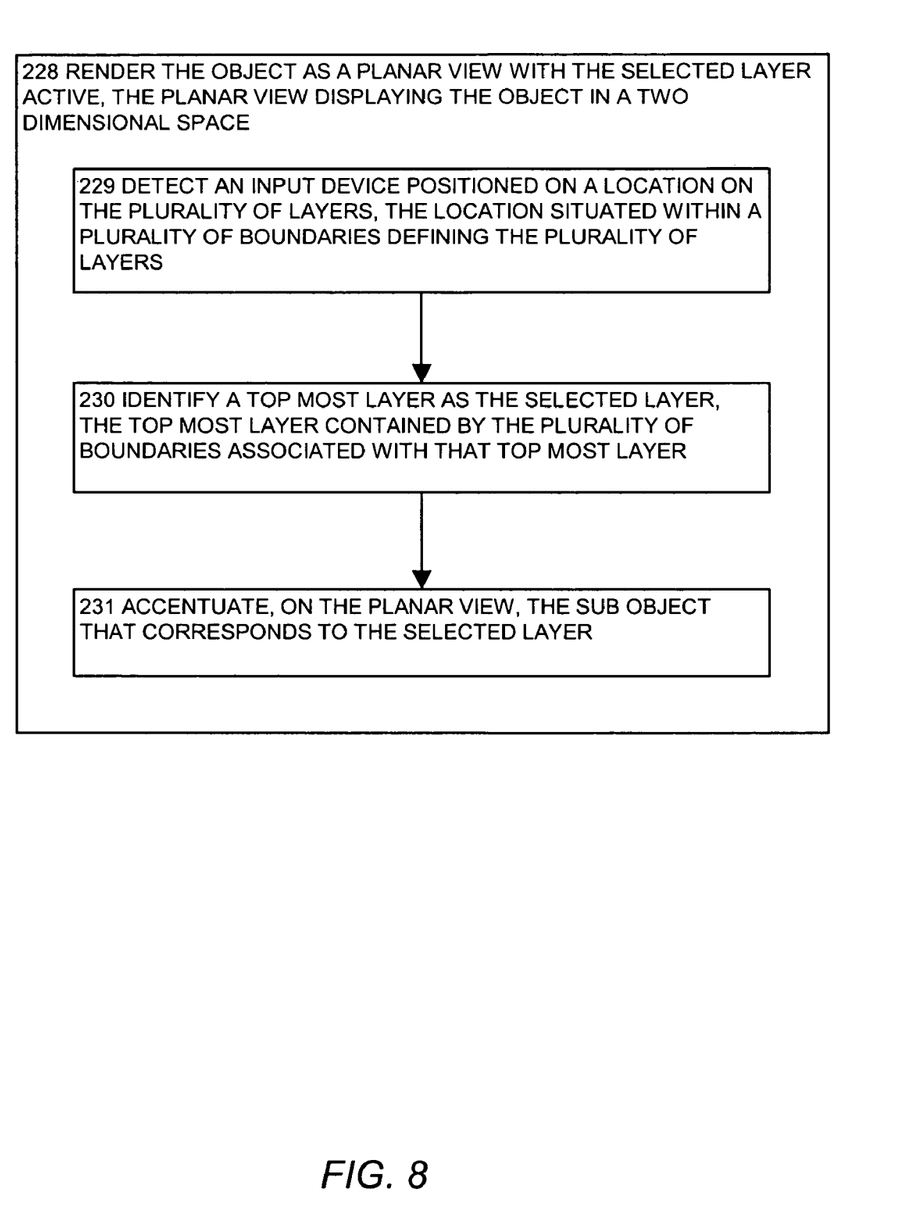
FIG. 8 illustrates a flowchart of a procedure performed by the system of FIG. 1 when the object navigating process renders the object as a planar view with the selected layer active, the planar view displaying the object in a two dimensional space, according to one embodiment disclosed herein.

FIG. 8 is an embodiment of the steps performed by the object navigating process 140-2 when it renders the object 150 as a planar view 180 with the selected layer 170-1 active.

In step 228, the object navigating process 140-2 renders the object 150 as a planar view 180 with the selected layer 170-1 active. The planar view 180 displays the object 150 in a two dimensional space. In an example configuration, the object navigating process 140-2 receives a selection from the user 108, and selects the layer 170-1 from the plurality of layers 170-N in the three-dimensional view 175. In response, the object navigating process 140-2 renders the object 150 as a planar view 180 with the selected layer 170-1 active, indicating the selected layer 170-1 has been chosen by the user 108.

In step 229, the object navigating process 140-2 detects an input device 116 positioned on a location on the plurality of layers 170-N, the location situated within a plurality of boundaries defining the plurality of layers 170-N. In an example configuration, a user 108 has placed an input device 116 (i.e., a mouse, pointer, etc) on a location that encompasses the boundaries for several layers 170-N. In other words, the plurality of layers 170-N overlap, and the user 108, placing an input device 116 on one of the layers 170-1, is actually pointing to more than one layer 170-N.

In step 230, the object navigating process 140-2 identifies a top most layer 170-1 as the selected layer 170-1, the top most layer 170-1 contained by the plurality of boundaries associated with that top most layer 170-1. In an example configuration, each layer 170-1 is rendered with a boundary (depicted by the distinct tint). Multiple layers 170-N layered on top of each other create a situation where multiple boundaries lie on the same location within the three-dimensional view 175. When the object navigating process 140-2 detects an input device 116 on a location contained by multiple boundaries, the object navigating process 140-2 identifies the top most layer 170-1 as the layer 170-1 selected by the input device 116.

In step 231, the object navigating process 140-2 accentuates, in the planar view 180, the sub object 155-1 that corresponds to the selected layer 170-1. In an example configuration, the top most layer (in the three-dimensional view 175), selected by the input device 116, corresponds to a sub object 155-1 within the planar view 180. The object navigating process 140-2 accentuates (for example, highlights, makes bold, etc) the sub object 155-1 that corresponds to the selected layer 170-1.

Figure 9:
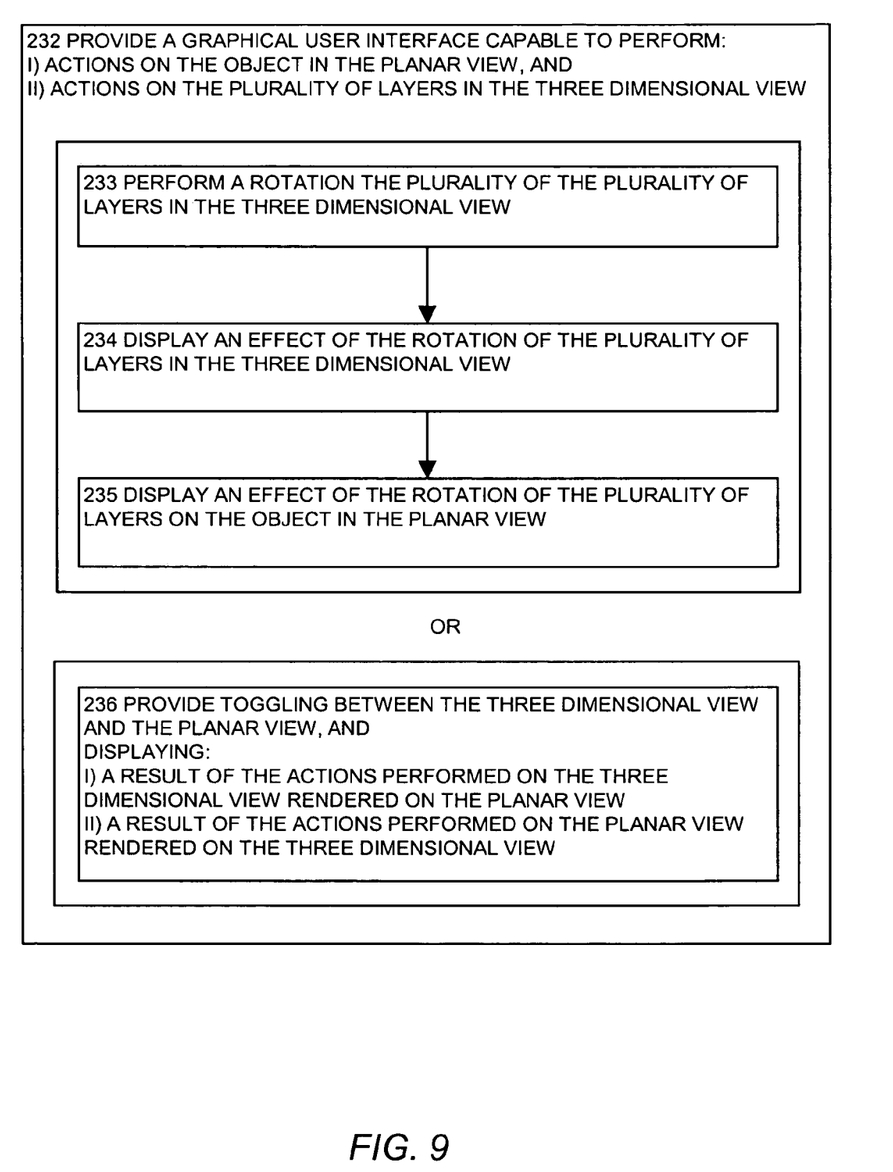
FIG. 9 illustrates a flowchart of a procedure performed by the system of FIG. 1 when the object navigating process operates the graphical user interface to perform actions on the object in the planar view, and actions on the plurality of layers in the three-dimensional view, according to one embodiment disclosed herein.

FIG. 9 is an embodiment of the steps performed by the object navigating process 140-2 when it operates the graphical user interface 160 to perform actions on the object 150 in the planar view 180, and actions on the plurality of layers 170-N in the three-dimensional view 175.

In step 232, the object navigating process 140-2 provides a graphical user interface 160 capable to perform actions on the object 150 in the planar view 180, and actions on the plurality of layers 170-N in the three-dimensional view 175. In an example configuration, a user 108 can add/delete/modify/manipulate/etc the object 150 in the planar view 180, and the plurality of layers 170-N in the three-dimensional view 175. In response, those additions/deletions/modifications/manipulations/etc will be reflected on both the object 150 in the planar view 180, and the plurality of layers 170-N in the three-dimensional view 175.

In step 233, the object navigating process 140-2 performs a rotation of the plurality of layers 170-N in the three-dimensional view 180. In an example configuration, a user 108 rotates the layers 177-N within the three-dimensional view 175. In response, the object navigating process 140-2 performs a rotation of the plurality of layers 170-N in the three-dimensional view 175 to correspond with the rotation provided by the user 108 on the graphical user interface 160.

In step 234, the object navigating process 140-2 displays an effect of the rotation of the plurality of layers 170-N in the three-dimensional view 175. In an example configuration, the user 108 rotates the layers 177-N within the three-dimensional view 175, and is able to view, within the three-dimensional view 175, the effect of that rotation on the plurality of layers 170-N.

In step 235, the object navigating process 140-2 displays an effect of the rotation of the plurality of layers 177-N on the object 150 in the planar view 180. In an example configuration, the user 108 rotates the layers 177-N within the three-dimensional view 175, and is able to view, within the three-dimensional view 175, the effect of that rotation on the plurality of layers 170-N, as well as view the effect of that rotation on the object 150, viewed within the planar view 180 in the graphical user interface 160.

In step 236, the object navigating process 140-2 provides toggling between the three-dimensional view 175 and the planar view 180. The object navigating process 140-2 also provides display of a result of the actions performed on the three-dimensional view 175 rendered on the planar view 180 as well as a result of the actions performed on the planar view 180 rendered on the three-dimensional view 175. In an example configuration, a user 108 can toggle easily between the three-dimensional view 175 and the planar view 180. In an example configuration, a user 108 can view both the three-dimensional view 175 and the planar view 180 simultaneously. As the user 108 performs actions on the object 150 in the planar view 180, the user 108 is able to view the result of those actions on the plurality of layers 170-N in the three-dimensional view 175. Likewise, as the user 108 performs actions on the plurality of layers 170-N in the three-dimensional view 175, the user 108 is able to view the result of those actions on the object 150 in the planar view 180.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method in which at least one computer system accesses instructions from computer storage and executes the instructions to perform steps of:

rendering an object as a plurality of layers displayed within a three-dimensional view;

receiving a selection of a given layer from the plurality of layers in the three-dimensional view;

rendering the given layer of the object in a planar view, the planar view including a display of a representation of the given layer of the object in a two dimensional space;

detecting an input device positioned on the given layer in the three-dimensional view;

detecting the input device repositioning the given layer at a new location within the plurality of layers in the three-dimensional view; and in response to the repositioning, rendering the three-dimensional view with the given layer located at the new location in the three-dimensional view.

2. The computer-implemented method of claim 1 comprising:

receiving input to modify the given layer of the object as displayed in the planar view; and in response to receiving the input to modify the given layer:
modifying an appearance of the given layer of the object in the planar view depending on the input; and
modifying an appearance of the given layer in the three-dimensional view based on the appearance of the given layer in the planar view.

3. The computer-implemented method of claim 1 wherein the object contains a plurality of sub objects and comprising:
rendering the object in the planar view with the plurality of sub objects rendered to depict the new location of the given layer and the remaining plurality of layers as those layers correspond to their respective sub objects.

4. The computer-implemented method of claim 1 wherein the object contains a plurality of sub objects and wherein rendering the object as a planar view with the selected layer active, the planar view displaying the object in a two dimensional space comprises:
detecting an input device positioned on a location on the plurality of layers, the location situated within a plurality of boundaries defining the plurality of layers;
identifying a top most layer as the selected layer, the top most layer contained by the plurality of boundaries associated with that top most layer; and
accentuating, on the planar view, the sub object that corresponds to the selected layer.

5. The computer-implemented method of claim 2 wherein providing a graphical user interface capable to perform actions on the object in the planar view and operating the graphical user interface to perform actions on the plurality of layers in the three-dimensional view comprises:
performing a rotation of the plurality of layers in the three-dimensional view;
displaying an effect of the rotation of the plurality of layers in the three-dimensional view; and
displaying an effect of the rotation of the plurality of layers on the object in the planar view.

6. The computer-implemented method of claim 2 wherein providing a graphical user interface capable to perform actions on the object in the planar view and operating the graphical user interface to perform actions on the plurality of layers in the three-dimensional view comprises:
providing toggling between the three-dimensional view and the planar view, and displaying:
i) a result of the actions performed on the three-dimensional view rendered on the planar view; and
ii) a result of the actions performed on the planar view rendered on the three-dimensional view.

7. The computer-implemented method of claim 1, wherein receiving the selection of the given layer comprises:
detecting input provided to the three-dimensional view, the input reordering the plurality of layers in the three-dimensional view, the three-dimensional view concurrently displayed with the planar view of the object, the planar view comprising a two-dimensional view;
in response to detecting the input provided to the three-dimensional view:
rendering the object in the three-dimensional view to reflect the reordered layers; and
rendering the object in the two-dimensional view to reflect the reordered layers from the input provided to the three-dimensional view.

8. The computer-implemented method as in claim 1, wherein rendering the object as a plurality of layers displayed within the three-dimensional view includes:
applying unique transparent color tinting to each of the plurality of layers to visually distinguish each of the plurality of layers from each other.

9. The computer-implemented method as in claim 8, wherein rendering the object as a plurality of layers displayed within the three-dimensional view includes:
providing an offset spacing between each of the plurality of layers in the three-dimensional view.

10. The computer-implemented method as in claim 9, wherein the object is a document being edited in a graphical editor.

11. The computer-implemented method as in claim 8, wherein applying the unique transparent color tinting to each of the plurality of layers to visually distinguish the layers from each other includes:
generating a tint differential value based on a number of layers associated with the object; and
utilizing the tint differential value as a guide to control a difference in tinting between successive layers of the object.

12. The computer-implemented method as in claim 8, wherein rendering the object as a plurality of layers displayed within the three-dimensional view comprises:
identifying, within the planar view, a plurality of sub objects contained within the object;
rendering each sub object within the plurality of sub objects in the planar view as a respective layer within the plurality of layers rendered in the three-dimensional view; and
ordering the plurality of layers in the three-dimensional view to match an order of the plurality of sub objects in the planar view.

13. The computer-implemented method as in claim 12 further comprising:
displaying the object in the planar view to include multiple sub objects, each of the multiple sub objects in the planar view representing a respective layer in the three-dimensional view; and
in response to the repositioning of the given layer in the three-dimensional view, modifying display of the sub objects in the planar view such that the sub objects in the planar view correspond to the ordering of the layers in the three-dimensional view.

14. A computer implemented method in which at least one computer system accesses instructions from computer storage and executes the instructions to perform steps of:
rendering an object as a plurality of layers displayed within a three-dimensional view on a display device;
receiving a selection of a layer from the plurality of layers in the three-dimensional view;
in response to receiving the selection, rendering a view of the object in a planar view with the selected layer being active the planar view with the selected layer being active, the planar view displaying the object in a two dimensional space;

wherein rendering the object as a plurality of layers displayed within the a three-dimensional view comprises:

identifying, within the planar view, a plurality of sub objects within the object;

rendering each sub object within the plurality of sub objects in the planar view as a respective layer within the plurality of layers rendered in the three-dimensional view; and ordering the plurality of layers to correlate to an order of the plurality of sub objects.

15. The computer-implemented method of claim 14 wherein rendering each sub object within the plurality of sub objects in the planar view as a respective layer within the plurality of layers rendered in the three-dimensional view comprises:

rendering each layer as a visually distinct layer within the plurality of layers;

rendering a distance between each layer within the plurality of layers; and scaling the plurality of layers based on a size of the object.

16. The computer-implemented method of claim 15 wherein rendering each layer as a visually distinct layer within the plurality of layers comprises:

rendering each layer to include at least one of:
i) a virtual lighting effect causing the layer to cast a shadow;
ii) an occlusion effect on the layer within the plurality of layers;
iii) a transparency effect on the layer within the plurality of layers;
iv) a tint on the layer, each layer within the plurality of layers rendered with a distinct tint, the distinct tint differentiated from the respective distinct tint of the other layers by calculating a tint differential based on a number of layers within the plurality of layers;
v) a mapping of an image of the respective sub object to the layer; or
vi) additional data encoded on the layer, the additional data depicted as generally perpendicular to the layer.

17. The computer-implemented method of claim 16 wherein rendering each layer to include additional data encoded on the layer, the additional data depicted as generally perpendicular to the layer comprises:

rendering each layer to include additional data including at least one of:
i) a color density of the sub object encoded on the layer;
ii) a temperature depicted on the sub object encoded on the layer;
iii) a saturation level depicted the sub object encoded on the layer;
iv) an audio component encoded on the layer; or
v) a color value encoded on the layer.

18. The computer-implemented method of claim 15 wherein rendering a distance between each layer within the plurality of layers comprises:

rendering the distance between each layer to include semantics associated with a degree of transparency related to each layer.

19. The computer-implemented method of claim 14 wherein ordering the plurality of layers to correlate to an order of the plurality of sub objects comprises:

calculating a location of each sub object within the plurality of sub objects, the location indicating a reference of each sub object with respect to the plurality of sub objects;

calculating an angular transformation for each sub object within the plurality of sub objects, the angular transformation indicating a graphical rotation by which the sub object will be viewable as an individual layer among the plurality of layers in the three-dimensional view; and offsetting each layer within the plurality of layers such that each layer is selectable within the three-dimensional view.

20. A computerized device comprising:

a memory;

a processor;

a communications interface;

an interconnection mechanism coupling the memory, the processor and the communications interface;

wherein the memory is encoded with a object navigating application that when executed on the processor provides object navigation on the computerized device by performing the operations of:

rendering an object as a plurality of layers displayed within a three-dimensional view;

receiving a selection of a layer from the plurality of layers in the three-dimensional view; and rendering the object as a planar view with the selected layer active, the planar view displaying the object in a two dimensional space, wherein receiving the selection of the layer includes:

receiving a selection of a visually isolated edge with an input device to select the layer; and performing an operation on the layer to modify an order of the layers as the layers are rendered within the three-dimensional view, wherein modifying the order of the layers includes:

detecting an input device positioned on a layer;

detecting an input device repositioning the layer at a new location within the plurality of layers; and rendering the three-dimensional view with the layer located at the new location and the remaining plurality of layers displaced with respect to the new location of the layer.

21. The computerized device of claim 20 wherein the computerized device performs the operation of:

providing a graphical user interface capable to perform:
i) actions on the object in the planar view; and
ii) actions on the plurality of layers in the three-dimensional view.

22. The computerized device of claim 20 wherein when the computerized device performs the operation of rendering an object as a plurality of layers displayed within a three-dimensional view, the computerized device performs the operations of:

identifying, within the planar view, a plurality of sub objects contained within the object;

rendering each sub object within the plurality of sub objects in the planar view as a respective layer within the plurality of layers rendered in the three-dimensional view; and ordering the plurality of layers to correlate to an order of the plurality of sub objects.

23. The computerized device of claim 22 wherein when the computerized device performs the operation of ordering the plurality of layers to correlate to an order of the plurality of sub objects, the computerized device performs the operations of:

calculating a location of each sub object within the plurality of sub objects, the location indicating a reference of each sub object with respect to the plurality of sub objects;

calculating an angular transformation for each sub object within the plurality of sub objects, the angular transformation indicating a graphical rotation by which the sub object will be viewable as an individual layer among the plurality of layers in the three-dimensional view; and offsetting each layer within the plurality of layers such that each layer is selectable within the three-dimensional view.

24. A computer readable medium encoded with computer programming logic that when executed on a process in a computerized device produces an object navigating process that provides object navigation, the medium comprising:

instructions for rendering an object as a plurality of layers displayed within a three-dimensional view;

instructions for receiving a selection of a layer from the plurality of layers in the three-dimensional view; and instructions for rendering the object as a planar view with the selected layer active, the planar view displaying the object in a two dimensional space, wherein the instructions for receiving the selection of the layer include:

instructions for receiving a selection of a visually isolated edge with an input device to select the layer; and instructions for performing an operation on the layer to modify an order of the layers as the layers are rendered within the three-dimensional view, wherein the instructions for modifying the order of the layers include:

instructions for detecting an input device positioned on a layer;

instructions for detecting an input device repositioning the layer at a new location within the plurality of layers; and instructions for rendering the three-dimensional view with the layer located at the new location and the remaining plurality of layers displaced with respect to the new location of the layer.

25. The computer readable medium of claim 24 further comprising:

instructions for providing a graphical user interface capable to perform:
i) actions on the object in the planar view; and
ii) actions on the plurality of layers in the three-dimensional view.

26. The computer readable medium of claim 24 wherein the instructions for rendering an object as a plurality of layers displayed within a three-dimensional view comprise:

instructions for identifying, within the planar view, a plurality of sub objects contained within the object;

instructions for rendering each sub object within the plurality of sub objects in the planar view as a respective layer within the plurality of layers rendered in the three-dimensional view; and instructions for ordering the plurality of layers to correlate to an order of the plurality of sub objects.

27. The computer readable medium of claim 26 wherein the instructions for ordering the plurality of layers to correlate to an order of the plurality of sub objects comprise:

instructions for calculating a location of each sub object within the plurality of sub objects, the location indicating a reference of each sub object with respect to the plurality of sub objects;

instructions for calculating an angular transformation for each sub object within the plurality of sub objects, the angular transformation indicating a graphical rotation by which the sub object will be viewable as an individual layer among the plurality of layers in the three-dimensional view; and instructions for offsetting each layer within the plurality of layers such that each layer is selectable within the three-dimensional view.

* * * * *